(12) United States Patent
Mustajarvi et al.

(10) Patent No.: US 9,742,677 B2
(45) Date of Patent: Aug. 22, 2017

(54) METHODS AND APPARATUS FOR MANAGING COMMUNICATIONS NETWORK LOADING

(71) Applicant: Nokia Solutions and Networks Oy, Espoo (FI)

(72) Inventors: Jari Pekka Mustajarvi, Espoo (FI); Maximilian Riegel, Nürnberg (DE)

(73) Assignee: Nokia Solutions and Networks Oy, Espoo (FI)

( * ) Notice: Subject to any disclaimer, the term of this patent is extended or adjusted under 35 U.S.C. 154(b) by 131 days.

(21) Appl. No.: 14/662,423

(22) Filed: Mar. 19, 2015

(65) Prior Publication Data
US 2015/0271077 A1 Sep. 24, 2015

(30) Foreign Application Priority Data

Mar. 20, 2014 (EP) .................................... 14160956

(51) Int. Cl.
| | |
|---|---|
| *H04W 4/00* | (2009.01) |
| *H04L 12/803* | (2013.01) |
| *H04L 1/00* | (2006.01) |
| *H04W 36/08* | (2009.01) |
| *H04W 36/22* | (2009.01) |
| *H04L 12/54* | (2013.01) |
| *H04W 48/18* | (2009.01) |
| *H04W 28/08* | (2009.01) |

(52) U.S. Cl.
CPC .......... *H04L 47/125* (2013.01); *H04L 1/0002* (2013.01); *H04L 12/5692* (2013.01); *H04W 36/08* (2013.01); *H04W 36/22* (2013.01); *H04L 1/0009* (2013.01); *H04W 28/08* (2013.01); *H04W 48/18* (2013.01)

(58) Field of Classification Search
CPC ...... H04L 47/125; H04W 36/22; H04W 36/08
USPC ........................................................ 370/252
See application file for complete search history.

(56) References Cited

U.S. PATENT DOCUMENTS

| | | | | |
|---|---|---|---|---|
| 6,141,388 A | * | 10/2000 | Servais ................. | H03M 13/39 375/262 |
| 2010/0285803 A1 | * | 11/2010 | Persson ................. | H04W 28/22 455/436 |

(Continued)

FOREIGN PATENT DOCUMENTS

| | | |
|---|---|---|
| EP | 2068481 A2 | 6/2009 |
| WO | WO 2007053141 A1 | 5/2007 |

OTHER PUBLICATIONS

IEEE Std 802.11b-1999 (Supplement to ANSI/IEEE Std 802.11, 1999 Edition): "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band"; Sponsor LAN/MAN Standards Committee of the IEEE Computer Society; IEEE; 3 Park Avenue; New York; NY 10016-5997; USA; Approved Sep. 16, 1999; pp. 1-97.

(Continued)

*Primary Examiner* — Farah Faroul
(74) *Attorney, Agent, or Firm* — Harrington & Smith

(57) ABSTRACT

There is provided a method comprising estimating bit rate information for first traffic if said first traffic were to be routed between a user equipment which is attached to a first network and a network access point of a second network and determining if said first traffic is to be routed between said user equipment and said network access point in dependence on said estimated bit rate information.

15 Claims, 5 Drawing Sheets

(56) References Cited

U.S. PATENT DOCUMENTS

| | | | | |
|---|---|---|---|---|
| 2013/0237233 A1* | 9/2013 | Radulescu | ............ | H04W 36/22 455/440 |
| 2014/0064158 A1* | 3/2014 | Timus | ............ | H04W 36/30 370/279 |
| 2014/0192643 A1* | 7/2014 | Kalapatapu | ............ | H04W 48/00 370/230 |
| 2014/0334293 A1* | 11/2014 | Narasimha | ............ | H04W 28/08 370/229 |
| 2015/0131537 A1* | 5/2015 | Chiang | ............ | H04L 5/0057 370/329 |

OTHER PUBLICATIONS

Intel Corporation: "New Work Item Proposal: WLAN/3GPP Radio Interworking"; 3GPP TSG WG-RAN Meeting #62; Korea, Busan, Dec. 3-Dec. 6, 2013; RP-132101; pp. 1-7.

3GPP TR 37.834 V12.0.0 (Dec. 2013): "3$^{rd}$ Generation Partnership Project; Technical Specification Group Radio Access Network; Study on Wireless Local Area Network (WLAN)—3GPP radio interworking (Release 12)"; pp. 1-17; 3rd Generation Partnership Project (3GPP); Mobile Competence Centre; 650, Route des Lucioles; F-06921 Sophia-Antipolis Cedex; France.

IEEE Std 802.11-2012 (Revision of IEEE Std 802.11-2007): "IEEE Standard for Information technology—Telecommunications and information exchange between systems Local and metropolitan area networks—Specific requirements: Part 11: Wireless LAN Medium Access Control (MAC) and Physical Layer (PHY) Specifications"; IEEE Computer Society; Sponsored by the LAN/MAN Standards Committee; IEEE; 3 Park Avenue; New York; NY 10016-5997; USA; Mar. 29, 2012; pp. 1-2793.

IEEE Std 802.16-2012 (Revision of IEEE Std 802.16-2009): "IEEE Standard for Air Interface for Broadband Wireless Access Systems"; IEEE Computer Society and the IEEE Microwave Theory and Techniques Society; Sponsored by the LAN/MAN Standards Committee; IEEE; 3 Park Avenue; New York; NY 10016-5997; USA; Aug. 17, 2012; pp. 1-2544.

* cited by examiner

METHODS AND APPARATUS FOR MANAGING COMMUNICATIONS NETWORK LOADING

BACKGROUND OF THE INVENTION

Field of the Invention

The present application relates to a method, apparatus and system and in particular but not exclusively, to network selection for the routing of traffic.

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communications may comprise, for example, communication of data for carrying communications such as voice, electronic mail (email), text message, multimedia and/or content data and so on. Non-limiting examples of services provided include two-way or multi-way calls, data communication or multimedia services and access to a data network system, such as the Internet.

In a wireless communication system at least a part of communications between at least two stations occurs over a wireless link. Examples of wireless systems include public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. An example of attempts to solve the problems associated with the increased demands for capacity is an architecture that is known as the long-term evolution (LTE) of the Universal Mobile Telecommunications System (UMTS) radio-access technology. The LTE is being standardized by the 3$^{rd}$ Generation Partnership Project (3GPP). The various development stages of the 3GPP LTE specifications are referred to as releases. The aim of the standardization is to achieve a communication system with, inter alia, reduced latency, higher user data rates, improved system capacity and coverage, and reduced cost for the operator. In the following certain exemplifying embodiments are explained with reference to a wireless or mobile communication system serving mobile communication devices.

SUMMARY OF THE INVENTION

In a first aspect, there is provided a method comprising estimating bit rate information for first traffic if said first traffic were to be routed between a user equipment which is attached to a first network and a network access point of a second network and determining if said first traffic is to be routed between said user equipment and said network access point in dependence on said estimated bit rate information.

Estimating bit-rate information may comprise estimating a modulation and channel coding for said first traffic if said first traffic were to be routed between the user equipment which is attached to the first network and the network access point of the second network.

Estimating said modulation and channel coding may comprise using condition information of a link between the user equipment and the network access point of the second network.

Link condition information may comprise at least one of received radio signal power and received radio signal quality.

The method may comprise estimating the bit rate information in dependence on load information of the second network.

The load information of the second network may comprise at least one of available backbone capacity and available channel percentage of the second network.

The first network may be one of a wireless local area network and a cellular network and the second network is the other of a wireless local network and a cellular network.

Said determining may comprise determining the first traffic to be routed between said user equipment and said network access point of the second network when the estimated bit rate information is higher than a first threshold or higher than an achieved bit rate between the user equipment and the first network.

A second traffic may be routed between the user equipment and an access point of the first network and said determining may comprise determining the proportion of the first traffic with respect to the second traffic to be routed between said user equipment and said network access point of the second network when the estimated bit rate information is higher than the first threshold or higher than an achieved bit rate between the user equipment and the first network.

Said determining may comprise causing the first traffic to be routed between the user equipment and said network access point of the second network until an achieved bit rate is lower than a second threshold.

Said determining may comprise causing the first traffic to be routed between the user equipment and said network access point of the second network until the achieved bit rate is lower than the second threshold for a first time period.

The second threshold may be lower than the first threshold.

Said determining may comprise causing the first traffic to be routed between the user equipment and a network access point of the first network for at least a second time period.

The second time period may be inversely proportional to the amount of time the first traffic was previously routed between the user equipment and the network access point of the second network.

The method may comprise performing the method at one of the network access point of the second network or a network element of the second network.

The method may comprise receiving minimum bit rate information and routing traffic to the network access point of the second network only if the access point supports the minimum bit-rate.

In a second aspect there is provided an apparatus, said apparatus comprising means for estimating bit rate information for first traffic if said first traffic were to be routed between a user equipment which is attached to a first network and a network access point of a second network and means for determining if said first traffic is to be routed between said user equipment and said network access point in dependence on said estimated bit rate information.

The means for estimating bit-rate information may comprise means for estimating a modulation and channel coding for said first traffic if said first traffic were to be routed between the user equipment which is attached to the first network and the network access point of the second network.

The means for estimating said modulation and channel coding may comprise means for using condition information of a link between the user equipment and the network access point of the second network.

Link condition information may comprise at least one of received radio signal power and received radio signal quality.

The apparatus may comprise means for estimating the bit rate information in dependence on load information of the second network.

The load information of the second network may comprise at least one of available backbone capacity and available channel percentage of the second network.

The first network may be one of a wireless local area network and a cellular network and the second network is the other of a wireless local network and a cellular network.

Said means for determining may comprise means for determining the first traffic to be routed between said user equipment and said network access point of the second network when the estimated bit rate information is higher than a first threshold or higher than the achieved bit rate between the user equipment and the first network.

A second traffic may be routed between the user equipment and an access point of the first network and said means for determining may comprise means for determining the proportion of the first traffic with respect to the second traffic to be routed between said user equipment and said network access point of the second network when the estimated bit rate information is higher than the first threshold or higher than an achieved bit rate between the user equipment and the first network.

Said means for determining may comprise means for causing the first traffic to be routed between the user equipment and said network access point of the second network until an achieved bit rate is lower than a second threshold.

Said means for determining may comprise means for causing the first traffic to be routed between the user equipment and said network access point of the second network until the achieved bit rate is lower than the second threshold for a first time period.

The second threshold may be lower than the first threshold.

Said means for determining may comprise means for causing the first traffic to be routed between the user equipment and a network access point of the first network for at least a second time period.

The second time period may be inversely proportional to the amount of time the first traffic was previously routed between the user equipment and the network access point of the second network.

The apparatus may comprise means for performing the method at one of the network access point of the second network or a network element of the second network.

The apparatus may comprise means for receiving minimum bit rate information and means for routing traffic to the network access point of the second network only if the access point supports the minimum bit-rate.

The apparatus may be provided in a user equipment, a network access point or a network element.

In a third aspect there is provided an apparatus, said apparatus comprising at least one processor and at least one memory including computer code for one or more programs, the at least one memory and the computer code configured, with the at least one processor, to cause the apparatus at least to estimate bit rate information for first traffic if said first traffic were to be routed between a user equipment which is attached to a first network and a network access point of a second network; and determine if said first traffic is to be routed between said user equipment and said network access point in dependence on said estimated bit rate information.

The at least one processor and at least one memory may be configured to estimate a modulation and channel coding for said first traffic if said first traffic were to be routed between the user equipment which is attached to the first network and the network access point of the second network.

The at least one processor and at least one memory may be configured to use condition information of a link between the user equipment and the network access point of the second network.

Link condition information may comprise at least one of received radio signal power and received radio signal quality.

The at least one processor and at least one memory may be configured to estimate the bit rate information in dependence on load information of the second network.

The load information of the second network may comprise at least one of available backbone capacity and available channel percentage of the second network.

The first network may be one of a wireless local area network and a cellular network and the second network is the other of a wireless local network and a cellular network.

The at least one processor and at least one memory may be configured to determine the first traffic to be routed between said user equipment and said network access point of the second network when the estimated bit rate information is higher than a first threshold or higher than the achieved bit rate between the user equipment and the first network.

A second traffic may be routed between the user equipment and an access point of the first network and said the at least one processor and at least one memory may be configured to determine the proportion of the first traffic with respect to the second traffic to be routed between said user equipment and said network access point of the second network when the estimated bit rate information is higher than the first threshold or higher than an achieved bit rate between the user equipment and the first network.

The at least one processor and at least one memory may be configured to cause the first traffic to be routed between the user equipment and said network access point of the second network until an achieved bit rate is lower than a second threshold.

The at least one processor and at least one memory may be configured to cause the first traffic to be routed between the user equipment and said network access point of the second network until the achieved bit rate is lower than the second threshold for a first time period.

The second threshold may be lower than the first threshold.

The at least one processor and at least one memory may be configured to cause the first traffic to be routed between the user equipment and a network access point of the first network for at least a second time period.

The second time period may be inversely proportional to the amount of time the first traffic was previously routed between the user equipment and the network access point of the second network.

The at least one processor and at least one memory may be configured to perform the method at one of the network access point of the second network or a network element of the second network.

The at least one processor and at least one memory may be configured to receive minimum bit rate information and route traffic to the network access point of the second network only if the access point supports the minimum bit-rate.

The apparatus may be one of, or provided in, a user equipment, a network access point or a network element.

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

DETAILED DESCRIPTION OF THE PREFERRED EMBODIMENTS

Before explaining in detail the exemplifying embodiments, certain general principles of a wireless communication system and mobile communication devices are briefly explained with reference to FIGS. 1 to 2 to assist in understanding the technology underlying the described examples.

In a wireless communication system mobile communication devices or user equipment (UE) 102, 103, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

Figure 1:
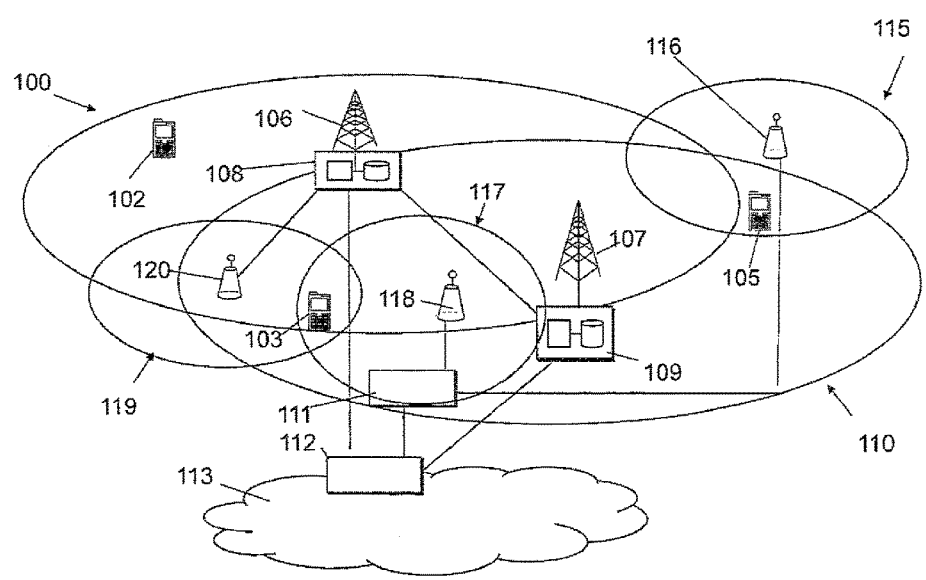
FIG. 1 shows a schematic diagram of a communication system comprising a base station and a plurality of communication devices.

In FIG. 1 base stations 106 and 107 are shown as connected to a wider communications network 113 via gateway 112. A further gateway function may be provided to connect to another network.

The smaller elements (e.g. smaller base stations or access points like e.g. WLAN access points) 116, 118 and 120 may also be connected to the network 113, for example by a separate gateway function and/or via the controllers of the macro level stations. In the example, elements 116 and 118 are connected via a gateway 111 whilst element 120 connects via the controller apparatus 108. In some embodiments, the smaller elements may not be provided.

Figure 2:
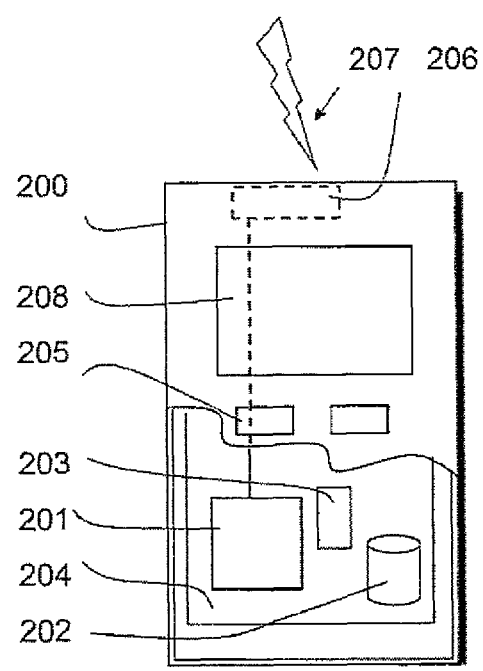
FIG. 2 shows a schematic diagram, of a mobile communication device.

A possible communication device will now be described in more detail with reference to FIG. 2 showing a schematic, partially sectioned view of a communication device 102. Such a communication device is often referred to as user equipment (UE) or terminal. An appropriate communication device may be provided by any device capable of sending and receiving radio signals. Non-limiting examples include a mobile station (MS) or device such as a mobile phone or what is known as a 'smart phone', a computer provided with a wireless interface card or other wireless interface facility (e.g., USB dangle), personal data assistant (PDA) or a tablet provided with wireless communication capabilities, or any combinations of these or the like. A communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information.

The device 102 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the device 200.

A device 200 is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the device by means of a suitable user interface such as key pad 205, voice commands, touch sensitive screen or pad, combinations thereof or the like. A display 208, a speaker and a microphone can be also provided. Furthermore, a communication device may comprise appropriate connectors (either wired or wireless) to other devices and/or for connecting external accessories, for example hands-free equipment, thereto.

The communication devices 102, 103, 105 may access the communication system 100 based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA), Carrier Sense Multiple Access With Collision Avoidance (CSMA/CA) and so on. Also a mixture of different access technologies is possible, for example base stations 106 and 107 may be based on OFDMA while the smaller elements 116, 118 and 120 may be based on CSMA/CA.

An example of wireless communication systems are architectures standardized by the 3rd Generation Partnership Project (3GPP) and Institute of Electrical and Electronics Engineers (IEEE). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access). WLAN is defined in IEEE 802.11 and WiMAX in IEEE 802.16 specifications.

LTE systems may be considered to have a so-called "flat" architecture, without the provision of RNCs; rather the (e)NB is in communication with a system architecture evolution gateway (SAE-GW) and a mobility management entity (MME), which entities may also be pooled meaning that a plurality of these nodes may serve a plurality (set) of (e)NBs. Each UE is served by only one MME and/or S-GW at a time and the (e)NB keeps track of current association. SAE-GW is a "high-level" user plane core network element in LTE, which may consist of the S-GW and the P-GW (serving gateway and packet data network gateway, respectively). The functionalities of the S-GW and P-GW are separated and they are not required to be co-located.

Figure 3:
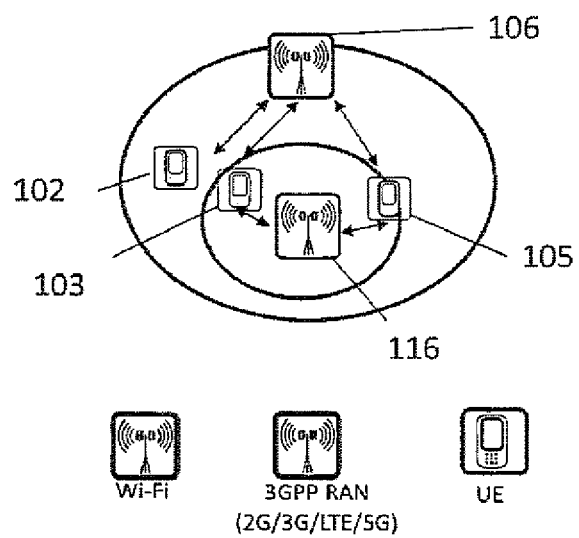
FIG. 3 shows a schematic diagram, of a communication system comprising a wireless access point.

FIG. 3 shows a communication system comprising UEs 102, 103, 105 and a 3GPP RAN base station 106, i.e. a base station of 2G, 3G, LTE, LTE-A or future (e.g. 5G) network. A UE 102 can access the 3GPP network via the 3GPP RAN base station. The communication system comprises a WLAN Access Point (AP) 116 which can be used by a UE 102 to access a WLAN for e.g. WLAN offloading. The AP 116 transmits beacons periodically to announce the presence of the WLAN.

Optimally, from a user point of view the UE 102 should be best connected at any given time to one or more networks in its proximity. From a cellular network operator point of view different scenarios are possible. In one scenario the UE 102 should only use WLAN offloading when offloading provides a required service level and use of WLAN is allowed by the RAN/the cellular network operator. Another scenario is to keep traffic in 3GPP networks until the network gets overloaded and only then start offloading to WLAN. In yet another scenario the operator may wish to offload to WLAN as much as possible as long as the WLAN connection can provide a required service level for the users or even without considering WLAN service level. There can be several different motivations for WiFi offloading depending for example on the operator, the type of available networks and the cost associated to these networks. Offloading comprises scenarios where part of the traffic is routed via a WLAN network while another part of the traffic is routed via 3GPP network.

WLAN offloading was initially considered in 3GPP Release 8 specifications and functions such as Access network discovery and selection function (ANDSF) which was specified for offloading purpose. ADNSF assists UEs in discovering non-3GPP access networks, such as for example Wi-Fi or WIMAX, that can be used for data communications alternatively or in addition to 3GPP access networks (such as HSPA or LTE). The ADNSF may provide the UE with rules to select a network and to route traffic through connected networks (3GPP and WLAN). RAN specific WLAN offload mechanisms are currently considered by 3GPP. Those would provide additional input and requirements for ANDSF based offloading which may be based on local RAN conditions as well as for non-ANDSF devices which currently do not have any 3GPP control for WLAN offloading.

3GPP radio strength and quality parameters like RSRP (Reference Signal Received Power) and RSRQ (Reference Signal Received Quality) have been identified as a trigger for WLAN offloading consideration. In this case, WLAN usage may be enabled or disabled based on different 3GPP signal thresholds. The WLAN itself can be assessed against WLAN radio measurements, such as RSSI (Radio Signal Strength Indication) and RCPI (Received Channel Power Indicator); and WLAN load indicators like WLAN channel utilisation and backbone capacity. WLAN may only be used when these indicators are good enough. The network operator/RAN could provide threshold values for these indicators allowing RAN to control how many devices would actually switch to WLAN. The threshold values could be, for example, broadcasted as part of the 3GPP System Information to a UE or could be provided to each UE separately via dedicated 3GPP signalling.

Alternatively, the RAN may have strict control of the UE's WLAN usage, which means that the RAN would explicitly command the device to start using WLAN, potentially based on WLAN measurement information collected from the WLAN UE prior to the offload decision or under control of a WLAN network controller.

It is desirable to define meaningful criteria to be provided to the UE so that the UE can decide when to use WLAN offloading and make the final decision of the WLAN usage.

APs may configure the broadcast transmission rate, which is used for transmission of beacons When the WLAN Access Point (AP) is under control of the operator or a network element, the operator may be able to adjust the encoding of the beacons by a particular Modulation and Channel Coding (MCS), i.e. a minimum bitrate. Preambles are transmitted according to the backward compatibility mode. If art AP is configured to support e.g. b/gin, the 802.11b preamble of 1 Mbps is used; however when g/n is configured, the faster 11 g preamble is used (16 μs instead of 96 μs (short preamble) or 192 μs (long preamble). Only UEs which have radio link conditions to allow it to successfully receive and send data frames with at least the bitrate provided by the chosen MCS for the beacon encoding may connect to the AP.

The operator may have the possibility to configure particular minimum-MCS values in the UEs so that the UEs may only connect to APs with this minimum-MCS or a higher MCS. The same scheme may then be deployed in the UE without configuration adjustments of the APs. This may achieve more differentiated control.

Each MCS may relate to specific instant bit-rate on which the transmission is carried out. Radio signal and quality measurements may influence the specific MCS to be selected, which may directly represent the minimum service level the operator desires to maintain. Previously, the desired minimum service level may have been obtained from evaluation of measured radio parameters which may lead to non-consistent behaviour between different implementations as the bit-rate associated to these radio signal and quality measurements depend on the used radio technology (802.11b/g/n/ac), implementation details and/or manufacturing variations. Some devices may be able to operate well in very poor radio conditions while others require much better radio conditions to provide the same link speed.

The UE may be able to estimate the available radio channel based on the exchanged WLAN signals. An initial estimate can be performed based on received WLAN beacons. Accuracy may be increased when transmission is initiated by the UE. Based on the received radio signal, a UE may be able to estimate what kind of MCS is achievable when communicating with the WLAN access point.

Figure 4:
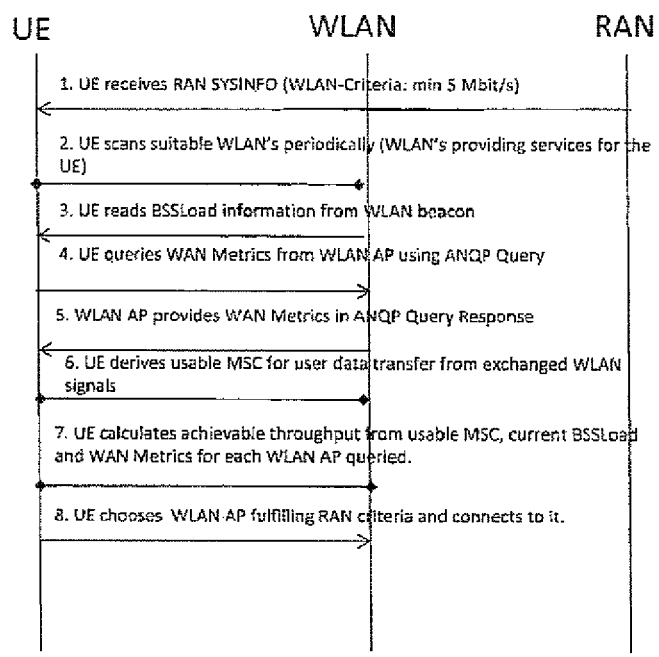
FIG. 4 shows a method of a WLAN offload decision.

In the method shown in FIG. 4, the achievable bit-rate, as it may be represented by the MCS, may be used as a criterion for network selection instead of radio signal measurement values. Estimated achievable bit-rate is a better measure of available service level than individual radio measurements. Estimated achievable bit-rate may be agnostic to implemented technology solutions and device receiver capabilities. Using estimating achievable bit-rate as a criterion for network selection doesn't increase battery consumption compared to other proposed measurements.

FIG. 4 shows an example method of WLAN offloading. In step 1, a UE may receive RAN SYSINFO. The SYSINFO may comprise the WLAN-criteria, e.g. the threshold bit-rate for WLAN offloading.

In step 2, the UE may scan suitable WLANS, for example periodically or via some implementation dependant strategy. In step 3, the UE may read BSSLoad information from the WLAN beacon. In step 4, the UE can query WAN Metrics from the WLAN AP using an ANQP Query. In step 5, the WLAN AP may provide WAN Metrics to the UE in an ANQP Query Response or in a WLAN beacon.

In step 6, the UE may derive usable MSC for user data transfer from the exchanged WLAN signals. In step 7, the UE may then calculate an achievable throughput from the usable MSC, current BSSLoad and WAN Metrics for each WLAN AP queried.

In step 7, achievable bit-rate may be estimated using the estimated MCS directly. This process gives instant bit-rate. However if the network is loaded, the UE and/or AP may only be able to achieve a portion of the achievable bit-rate.

An alternative method of estimation of achievable bit-rate is to use other information available from the radio environment together with estimated MCS derived bit-rate values. WLAN access points may report experienced network load in beacon and/or via dedicated query prior network association. By combining for example backbone network load information with the estimated MCS, a UE is able to create better estimate of the minimum achievable bit-rate in the cell.

The broadcasted load information in the WLAN beacon may comprise ChannelUtilization and StationCount information elements. ChannelUtilization may indicate a percentage of the time the AP senses the air channel is busy over a defined time period. StationCount may be the associated UE count in the AP.

Backbone link speed and available capacity in backbone may be for example identified by WAN (Wide Area Network) metrics.

The UE could, for example, estimate available throughput using the following series of equations:

$$\text{Estimated radio bit-rate} = \text{MCS\_br} * \text{ChannelPortion} \quad (1)$$

where MCS_br=instant bitrate from estimated MCS, and ChannelPortion=percentage of the air time available for the UE. Either a free channel utilization percentage or equal share percentage calculated over all connected users are available. The Maximum of these two values may be used as the ChannelPortion.

EXAMPLE 1

MCS_br=26 Mbit/s (802.11ac MCS-3)
StationCount=6
ChannelUtilization=156 (range 0-255)
Free channel utilization=100%*256−156)/256=39%
Equal share percentage=100%*1/7=14%
ChannelPortion=max(39%, 14%)=39%
Estimated radio bit-rate=39%*26 Mbit/s=10 Mbit/s
If available backbone capacity is included then, using the same analysis as for ChannelPortion, estimated backbone bit-rate can be calculated $$\text{Estimated backbone bit-rate} = \text{Backbone\_br} * \text{BackboneChannelPortion} \quad (2)$$

EXAMPLE 2

Backbone link speed=10 Mbit/s
Backbone load=120 (range 0-255)
Free backbone capacity=100%*(256−120)/256=53%
Equal share percentage=100%*1/7=14%
BackboneChannelPortion=max(53%, 14%)=53%
Estimated backbone bit-rate=53%*10 Mbit/s=5,3 Mbit/s
Estimated bit-rate=MIN (Estimated radio bit-rate, Estimated backbone bit-rate)=5.3 Mbit/s In step 8 of the method shown in FIG. 4, the UE may choose an WLAN AP which fulfils the RAN criteria for WLAN offloading and may connect to the chosen AP. The mechanism may require that the offloading criteria is fulfilled over time period T1 until offloading shall be commenced. T1 may be provided by the network and/or the network operator or it may be a pre-defined value.

If a UE connects to the WLAN and gets more accurate information of actual throughput or estimated throughput then the UE may decide to leave the WLAN if the throughput requirement is no longer fulfilled. An additional hysteresis may be included to avoid ping pong effects, i.e continuous switching between the WLAN and the RAN because neither fulfils the throughput criteria.

The hysteresis may be defined as a secondary bit-rate threshold or as penalty time T2 the UE shall stay in the WLAN. Alternatively, if service level drops rapidly below acceptable level in the WLAN and does not recover, the UE may change back to selected 3GPP network. In this case a longer time penalty may be applied to keep the UE in the 3GPP network. The assumption here could be that the UE is likely able to get some level of service in 3GPP network even when the network is congested. Rapid changes between WLAN and 3GPP networks should be avoided. The penalty time T2 or the secondary bit-rate threshold may have a predefined value or it may be provided by the network.

The penalty time T2 may be also reverse proportional to the service time in the previously used network. For example, if adequate service level was maintained only a short time in WLAN network, then the penalty time for not selecting WLAN would be longer than in case the WLAN service would have been adequate for a longer time in WLAN network.

The UE may route all the traffic to the WLAN or may route a portion of the traffic to the WLAN and retain a portion of the traffic on the cellular network. The UE may increase or decrease the proportion of the traffic that is routed through the WLAN in dependence of the achieved bit-rate when the UE connects to the WLAN.

Due to the reciprocity of the transmission channel, the same procedure for differentiation of different user levels can also be implemented in the network, by checking and enforcing different MCS levels according to user profiles during the authentication and association message exchanges. That is, the network may deploy the same method to decide traffic forwarding from the network to the UE, e.g. for services which are pushed to the UE. This may be performed at the access point and/or at the base station.

Figure 5:
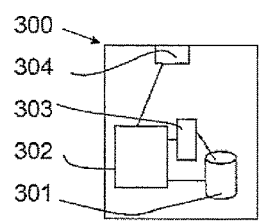
FIG. 5 shows a schematic diagram of a control apparatus.

The method may be implemented by a control apparatus as shown in FIG. 5. The control apparatus may be provided in one or more of the access point(s) and base stations. In some embodiments, the method may be implemented by the at least one processor and at least one memory of the UE. FIG. 5 shows an example of a control apparatus for a communication system, for example to be coupled to and/or for controlling a station of an access system, such as a base station or AP. Improved information about the available capacity would be available when control is implemented in the AP, because the AP may know about the link conditions of the links to all the associated UEs and can precisely calculate what kind of link capacity would be avail be for a particular UE. In some embodiments, APs may comprise a separate control apparatus. In other embodiments, the control apparatus can be another network element such as a radio network controller. In some embodiments, each AP may have such a control apparatus as well as a control apparatus being provided in a radio network controller. The control apparatus 109 can be arranged to provide control on communications in the service area of the system. The control apparatus 109 comprises at least one memory 301, at least one data processing unit 302, 303 and an input/output interface 304. Via the interface the control apparatus can be coupled to a receiver and a transmitter of the base station. For example the control apparatus 109 can be configured to execute an appropriate software code to provide the control functions.

It is noted that whilst embodiments have been described in relation to 3GPP RAN and WLAN, similar principles can be applied to any other communication system where internetworking is supported. Therefore, although certain embodiments were described above by way of example with reference to certain exemplifying architectures for wireless networks, technologies and standards, embodiments may be applied to any other suitable forms of communication systems than those illustrated and described herein.

The two access points through which a UE is able to receive or transmit traffic may belong to two different networks. One network may be cellular and the other network may be a wireless local area network. In other embodiments, the two networks may be of the same type.

It is also noted herein that while the above describes exemplifying embodiments of the invention, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), FPGA, gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. A method comprising:
   estimating bit rate information for routing first traffic for a user equipment, wherein the user equipment is currently connected to a first network, and the routing for which the bit rate information is being estimated is for a bit rate achievable for routing the first traffic between the user equipment and a second network, wherein the routing between the user equipment and the second network is a routing between the user equipment and a network access point of the second network; and
   determining whether or not to route said first traffic between said user equipment and said second network, based on said estimated bit rate information, wherein the determination is based on whether or not the estimated bit rate information indicates that the achievable bit rate exceeds a specified threshold, or exceeds the current bit rate for the first traffic.

2. A method according to claim 1, wherein estimating the achievable bit rate comprises estimating a modulation and channel coding for routing said first traffic between the user equipment and the network access point of the second network.

3. A method according to claim 2, wherein estimating said modulation and channel coding comprises using condition information of a link between the user equipment and the network access point of the second network.

4. A method according to claim 3, wherein the link condition information comprises at least one of received radio signal power and received radio signal quality.

5. A method according to claim 1 comprising estimating the achievable bit rate based on load information of the second network, wherein the load information of the second network comprises at least one of available backbone capacity and available channel percentage of the second network.

6. A method according to claim 1, wherein said determining comprises one of
   determining that the first traffic is to be routed between said user equipment and said second network when the estimated achievable bit rate is higher than a first threshold or higher than an achieved bit rate between the user equipment and the first network; and
   determining the proportion of the first traffic with respect to a second traffic to be routed between said user equipment and said network access point of the second network when the achievable bit rate is higher than the first threshold or higher than an achieved bit rate between the user equipment and the first network.

7. A method according to claim 6, wherein said determining comprises causing the first traffic to be routed between the user equipment and said network access point of the second network until an achieved bit rate between the user equipment and the second network is lower than a second threshold for a first time period.

8. A method according to claim 7, wherein said determining comprises causing the first traffic to be routed between the user equipment and a network access point of the first network for at least a second time period, wherein the second time period is inversely proportional to the amount of time the first traffic was previously routed between the user equipment and the network access point of the second network.

9. An apparatus, comprising:
   at least one processor and at least one memory including computer code for one or more programs, the at least one memory and the computer code configured, with the at least one processor, to cause the apparatus to perform at least the following:
   estimating bit rate information for routing of first traffic for a user equipment wherein the user equipment is currently connected to a first network, and the routing for which the bit rate information is being estimated is for a bit rate achievable for routing the first traffic between the user equipment and a second network, wherein the routing between the user equipment and the second network is a routing between the user equipment and a network access point of a second network; and
   determining whether or not to route said first traffic between said user equipment and said second network, based on said estimated bit rate information, wherein the determination is based on whether or not the estimated bit rate information indicates that the achievable bit rate exceeds a specified threshold, or exceeds the current bit rate for the first traffic.

10. An apparatus according to claim 9, wherein determining bit rate information comprises estimating a modulation and channel coding for said first traffic if said first traffic were to be routed between the user equipment which is attached to the first network and the network access point of the second network.

11. An apparatus according to claim 10, wherein estimating modulation and channel coding comprises using condition information of a link between the user equipment and the network access point of the second network.

12. A method according to claim 11, wherein the link condition information comprises at least one of received radio signal power and received radio signal quality.

13. An apparatus according to claim 9, wherein the at least one memory and the computer code are further configured, with the at least one processor, to cause the apparatus to perform: determining the bit rate information based on load information of the second network, wherein the load information of the second network comprises at least one of available backbone capacity and available channel percentage of the second network.

14. An apparatus according to claim 9 wherein the apparatus is one of the network access point of the second network or a network element of the second network.

15. A computer program product comprising a non-transitory computer readable medium comprising computer executable instructions which when executed are configured to cause an apparatus to perform the following:
   estimating bit rate information for routing of first traffic for a user equipment, wherein the user equipment is currently connected to a first network, and the routing for which the bit rate information is being estimated is for a bit rate achievable for routing the traffic between the user equipment and a second network, wherein the routing between the user equipment and the second network is a routing between the user equipment and network access point of a second network; and
   determining whether or not to route said first traffic between said user equipment and said second network, based on said bit rate information, wherein the determination is based on whether or not the estimated bit rate information indicates that the achievable bit rate exceeds a specified threshold, or exceeds the current bit rate for the first traffic.

* * * * *